US012515758B2

(12) United States Patent
McDonald et al.

(10) Patent No.: US 12,515,758 B2
(45) Date of Patent: Jan. 6, 2026

(54) BICYCLE HEADSET ASSEMBLY WITH MULTI-MATERIAL COMPRESSION RING

(71) Applicant: Specialized Bicycle Components, Inc., Morgan Hill, CA (US)

(72) Inventors: Jason Scott McDonald, San Jose, CA (US); David Alfredo Reyes Sanchez, Boulder Creek, CA (US); Jack Ervin Davies, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 705 days.

(21) Appl. No.: 17/902,226

(22) Filed: Sep. 2, 2022

(65) Prior Publication Data

US 2023/0074447 A1 Mar. 9, 2023

Related U.S. Application Data

(60) Provisional application No. 63/240,729, filed on Sep. 3, 2021.

(51) Int. Cl.
*B62K 21/20* (2006.01)
(52) U.S. Cl.
CPC .......... *B62K 21/20* (2013.01); *B62K 2201/00* (2013.01)
(58) Field of Classification Search
CPC .... B62D 3/126; B62D 5/0424; B62D 5/0445; B62D 5/0451
USPC .......................................... 180/444; 280/279
See application file for complete search history.

(56) References Cited

FOREIGN PATENT DOCUMENTS

| DE | 202008004845 U1 | 4/2008 | |
| DE | 102018006153 A1 * | 2/2020 | ............. B62J 11/10 |
| DE | 102018006153 B4 | 5/2021 | |
| EP | 2848508 A1 | 3/2015 | |

OTHER PUBLICATIONS

Benson, C. All-new 2021 Orbea Alma XC hardtail reborn as lighter, faster race-ready mountain bike. BikeRumor.com. Version accessed Dec. 3, 2021 at https://web.archive.org/web/20211203075255/https://bikerumor.com/all-new-2021-orbea-alma-xc-hardtail-reborn-as-lighter-faster-race-ready-mountain-bike/ (11 pages).

(Continued)

*Primary Examiner* — Valentin Neacsu
*Assistant Examiner* — Felicia L. Brittman-Alabi
(74) *Attorney, Agent, or Firm* — Michael Best & Friedrich LLP

(57) ABSTRACT

A bicycle includes a frame, a front fork, a fixed stop member fixed in relation to the frame, a bearing member that supports the front fork relative to the frame for rotation about a steering axis, and a compression ring. The compression ring includes a body portion between the bearing member and the front fork and a stop portion rotationally aligned with the fixed stop member to inhibit over-rotation of the front fork relative to the frame. The stop portion comprises a second material harder than the first material of the body portion. The stop portion can include a contact surface that contacts the fixed stop member when the front fork is sufficiently rotated, and the contact surface can comprise the second material. The second material can comprise one or more of aluminum, titanium, ceramic, and steel. The body portion can be formed as an overmold on the stop portion.

19 Claims, 8 Drawing Sheets

(56) References Cited

OTHER PUBLICATIONS

Morgan, J-M. First Ride: 2023 Orbea Oiz consolidates 10kg 120mm XC Race MTB. BikeRumor.com. Version accessed Nov. 3, 2022 at https://web.archive.org/web/20221103140842/https://bikerumor.com/2023-orbea-biz-120mm-xc-bike/ (29 pages).

Orbea—OIZ Technology page. Version accessed May 23, 2022 at https://web.archive.org/web/20220523024704/https://www.orbea.com/us-en/bicycles/mountain/oiz/technology (51 pages).

* cited by examiner

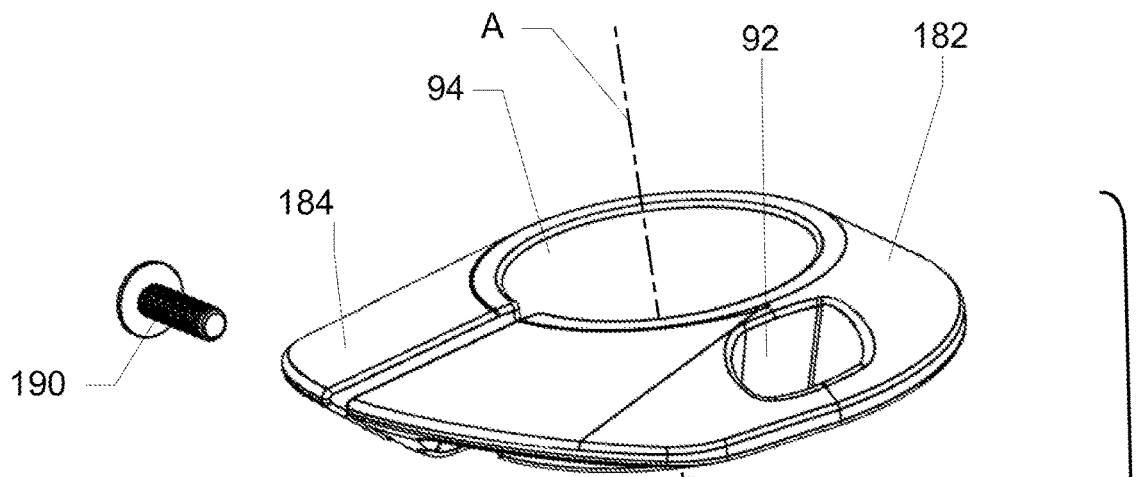
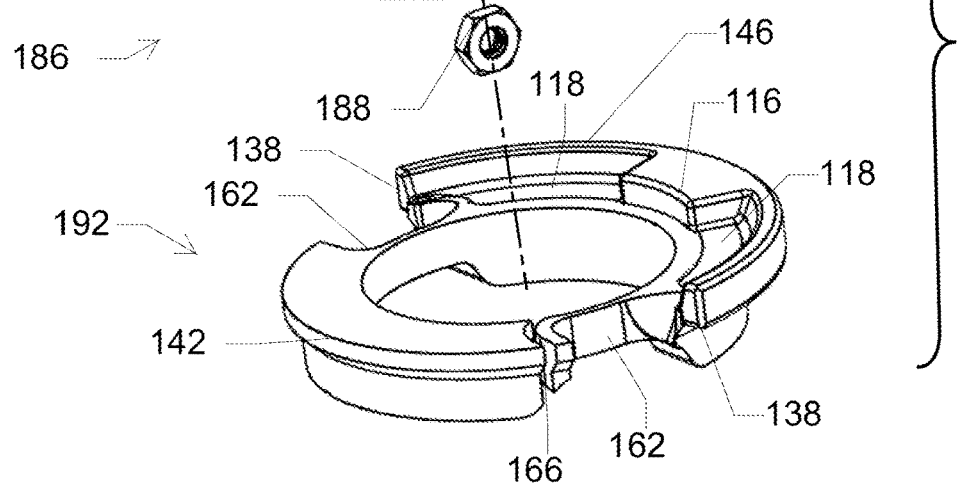
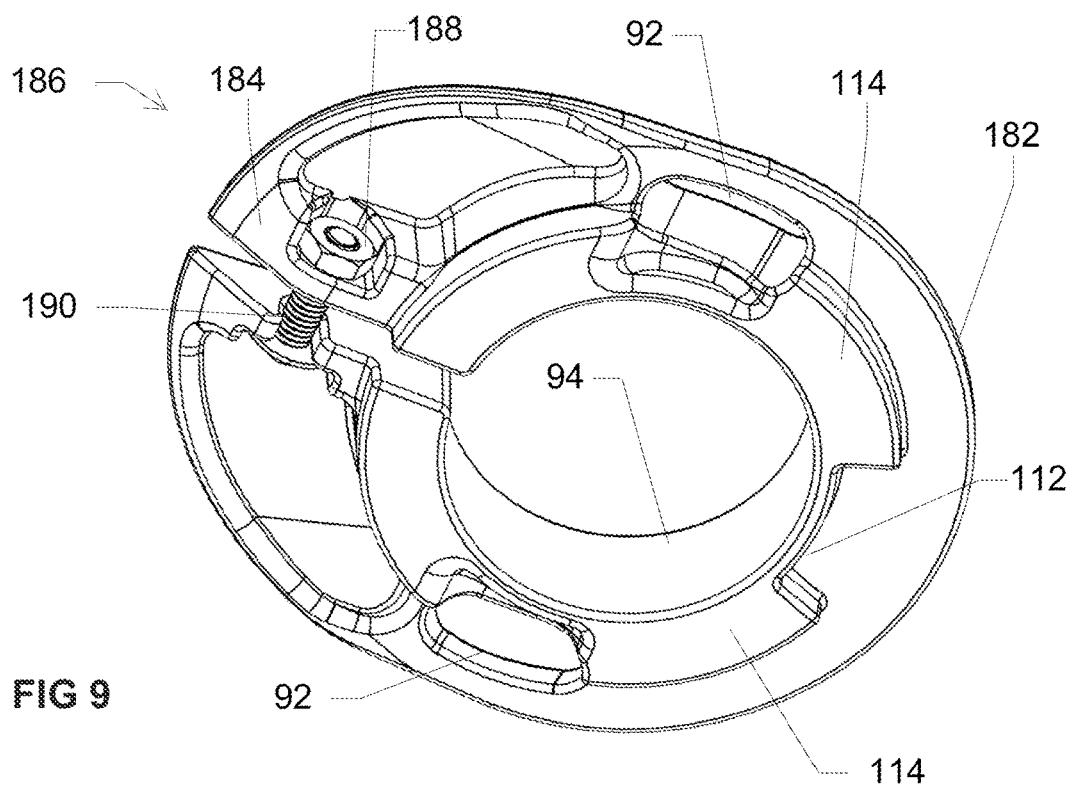

US 12,515,758 B2

BICYCLE HEADSET ASSEMBLY WITH MULTI-MATERIAL COMPRESSION RING

CROSS-REFERENCE TO RELATED APPLICATIONS

This application claims priority to U.S. Provisional Application No. 63/240,729, filed Sep. 3, 2021, the entire contents of which are incorporated herein by reference.

BACKGROUND

The present disclosure relates generally to the field of bicycles and specifically to compression rings used in bicycle headset assemblies.

Bicycles commonly include handlebars that are clamped in place onto a stem, which is clamped onto the steerer tube of a front fork. The front fork is rotatably supported in a head tube of a frame by headset bearings, which are preloaded using a compression ring, as is known in the art.

Bicycles sometimes also include steering stops that inhibit over-rotation of the handlebars, stem, and front fork relative to the bicycle frame. For example, these steering stops commonly include a first stop member secured for rotation with the front fork and a second stop member fixed in relation to the frame. Further, the first stop member will contact the second stop member when the fork is rotated to a set angle relative to the frame, thereby limiting further rotation of the front fork relative to the frame.

SUMMARY

The present disclosure provides a bicycle comprising a front wheel and a rear wheel, a frame supported by the front wheel and the rear wheel, a front fork, a fixed stop member fixed in relation to the frame, a bearing member that supports the front fork relative to the frame for rotation about a steering axis, and a compression ring that rotates with the front fork and provides axial preload on the bearing member in a direction substantially parallel to the steering axis. The compression ring includes a body portion between the bearing member and the front fork to maintain a spacing between the bearing member and the front fork, the body portion comprising a first material. The compression ring further includes a stop portion rotationally aligned with the fixed stop member to inhibit over-rotation of the front fork relative to the frame. The stop portion comprises a second material that is harder than the first material of the body portion. For example, the stop portion can include a contact surface that contacts the fixed stop member when the front fork is sufficiently rotated, and the contact surface can comprise the second material. In one embodiment, the second material comprises one or more of aluminum, titanium, ceramic, and steel. The body portion can be formed as an overmold on the stop portion.

The fork can comprise a steerer tube, and the bicycle can further comprise a clamp member secured to the steerer tube and rotationally fixed to the compression ring. The body portion can include a gap that facilitates compression of the compression ring onto the steerer tube.

The compression ring can comprise an aperture, and the bicycle can further include a control line positioned through the aperture. The bicycle can further comprise a headset cover positioned axially over the compression ring and including an opening, and the control line can be positioned through the opening. The headset cover can positioned axially over the fixed stop member throughout the entire range of motion of the front fork relative to the frame.

Other aspects of the disclosure will become apparent by consideration of the detailed description and accompanying drawings.

BRIEF DESCRIPTION OF THE DRAWINGS

FIG. 8 is an exploded perspective view of an alternative embodiment for the headset cover, clamp, and compression ring.

FIG. 9 is a perspective view of an underside of the headset cover of FIG. 8.

DETAILED DESCRIPTION

Before any embodiments are explained in detail, it is to be understood that the present disclosure is not limited in its application to the details of construction and the arrangement of components set forth in the following description or illustrated in the following drawings. The disclosure is capable of other embodiments and of being practiced or of being carried out in various ways. Further, as used herein, "handlebar" or "handlebars" refers to structure that is designed to be moved by a rider to steer a bicycle and encompasses single-structure, unitary structures as well as multi-piece structures.

Figure 1:
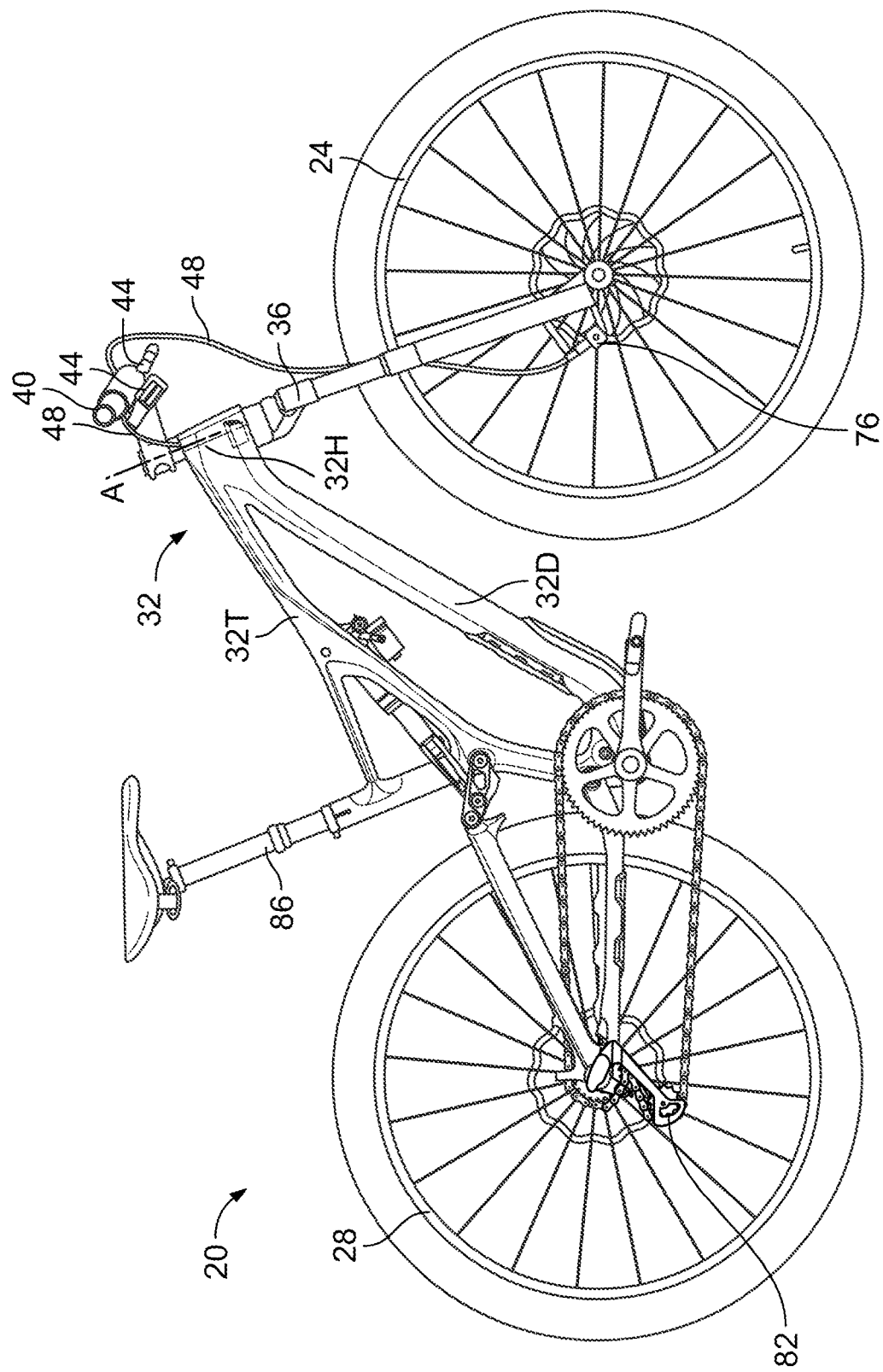
FIG. 1 is a side view of a bicycle according to one aspect of the present disclosure.

According to an exemplary embodiment, FIG. 1 illustrates a bicycle 20 having a front wheel 24 and a rear wheel 28. A frame 32 of the bicycle 20 is supported above the ground on the front and rear wheels 24, 28 and provides support for a rider to operate the bicycle 20. Although bicycle 20 is illustrated as non-motorized bicycle, in other embodiments, a motorized bicycle (e.g., an electric motorized bicycle or electric bicycle) can be implemented.

Figure 2:
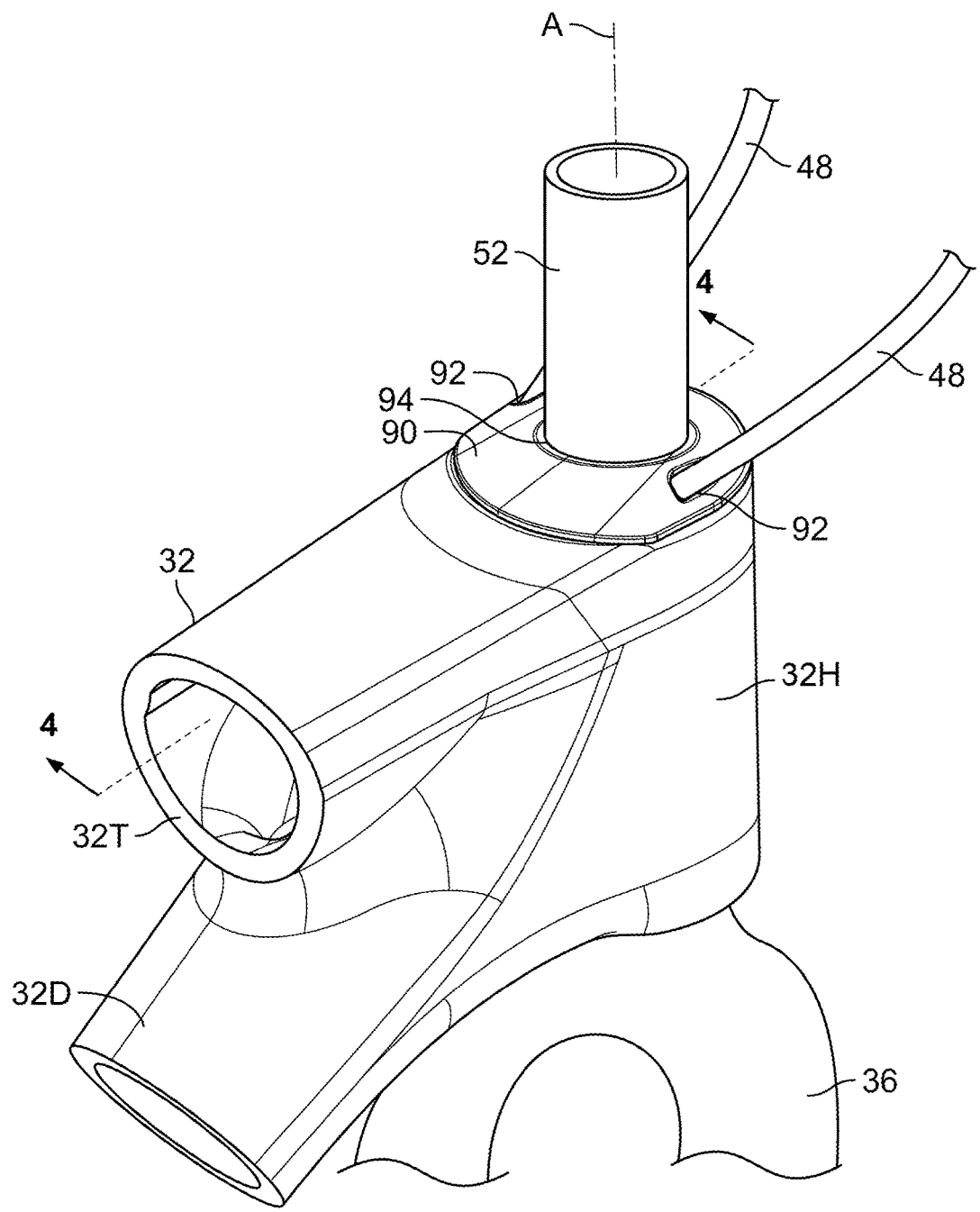
FIG. 2 is a perspective view of a front portion of the bicycle of FIG. 1, including a head tube accommodating a headset and a front fork.
Figure 3:
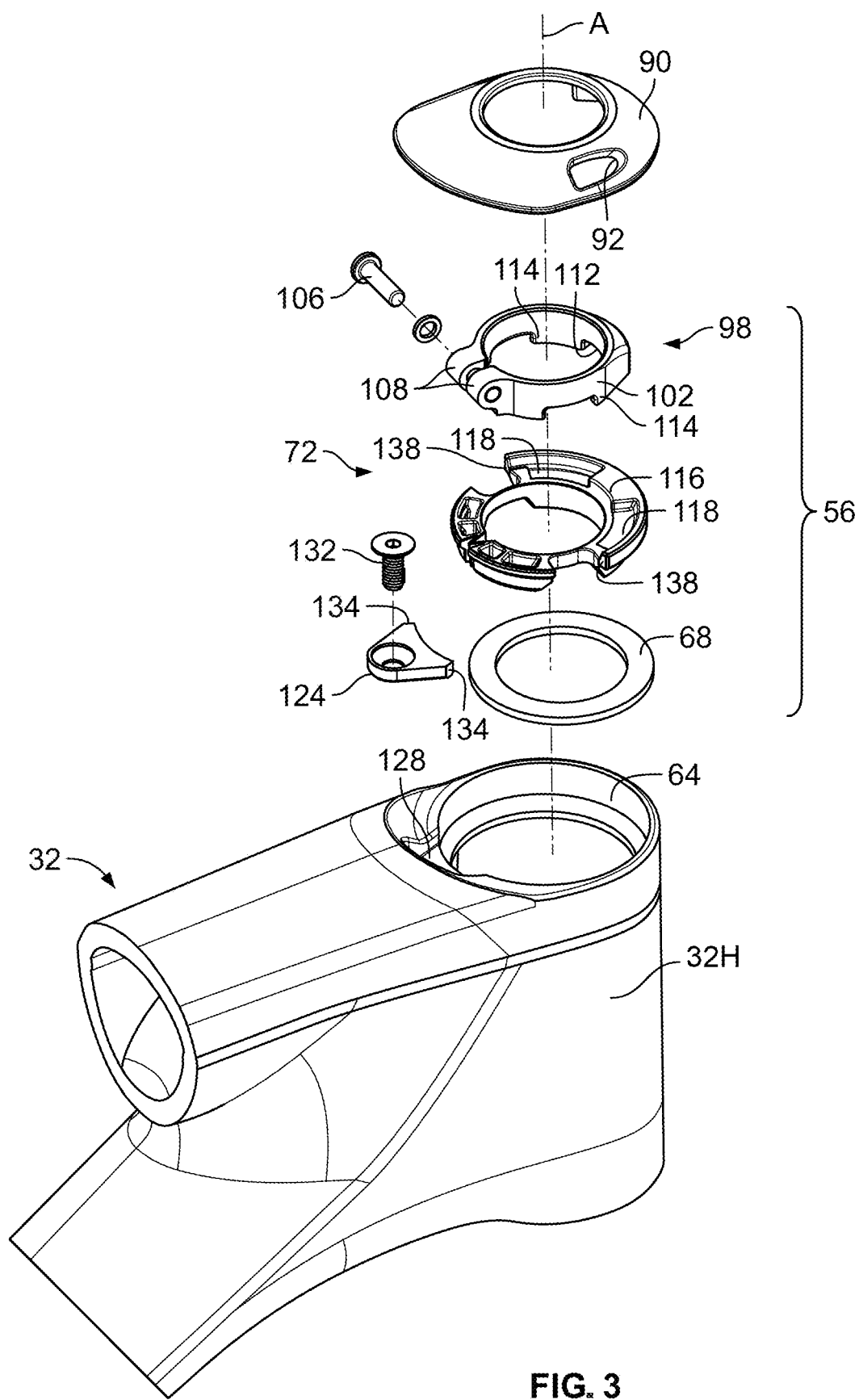
FIG. 3 is an exploded view of the head tube and an upper bearing assembly of the headset.

The illustrated frame 32 includes a top tube 32T, a down tube 32D, and a head tube 32H, although other frame configurations may be implemented. A front fork 36 is rotationally supported by the front wheel 24 at a wheel hub. The front fork 36 rotatably supports the frame 32 at the head tube 32H for the directional control of the bicycle 20 by the rider. In particular, handlebars 40 are operatively coupled to the front fork 36 to control rotation of the front fork 36, and along with it the front wheel 24, about a steering axis A relative to the frame 32. With reference to FIG. 2, the handlebars 40 are secured to a steerer tube 52 of the front fork 36 that extends upwardly through a head tube 32H along the steering axis A. The steerer tube 52 is supported for rotation within the head tube 32H by a headset, including a first or upper bearing assembly 56 (referred to hereinafter as "the headset bearing assembly 56") and a second or lower bearing assembly (not shown), which can be similar or identical to the headset bearing assembly 56. The headset bearing assembly 56 is received in a counterbore 64 at an upper end of the head tube 32H, as shown in FIG. 3, and the second bearing assembly can be received in another counterbore at a lower end of the head tube 32H. The headset bearing assembly 56 includes a bearing member 68 (e.g., a sealed roller bearing assembly) that supports the rotation of the front fork 36 about the steering axis A relative to the frame 32, and a compression ring 72 that is configured for rotation with the front fork 36. The compression ring 72 provides axial preload on the bearing member 68 in a direction substantially parallel to the steering axis A when the headset is assembled with the front fork 36 and the head tube 32H.

Returning to FIGS. 1 and 2, one or more control mechanisms (e.g., actuators 44) can be supported on the handlebars 40 for operation of ancillary components on the bicycle 20. For example, actuators 44 can be supported on the handlebars 40 for operation of ancillary components on the bicycle 20, such as, for example, a brake 76 (front and/or rear), a derailleur 82 (front and/or rear), a dropper seat post 86, and a suspension lockout (not shown). Thus, the actuator(s) 44 may individually be referred to as a brake actuator, a gear shifter, a seat height controller, or a suspension lockout controller. In other embodiments, one or more of actuator(s) 44 can be omitted. For embodiments implementing a motorized bicycle (e.g., an electric motorized bicycle or electric bicycle), one or more of the control mechanism(s) can control a motor and/or electrical components (e.g., a display mechanism) of the motorized bicycle. For example, the control mechanism(s) can include a remote control.

Some or all of the control mechanisms (e.g., actuators 44) can be cable-operated, either as a manual control via a mechanical control cable (e.g., braided wire) or as an electronic control cable (e.g., wire(s) for electronic communication). Alternatively, one or more of the control mechanisms (e.g., actuators 44) can be coupled to a fluid line, such as that for hydraulic control. The various mechanisms for connecting the control mechanisms (e.g., actuators 44) with the components controlled thereby may be referred to collectively as control lines. FIG. 2 illustrates two exemplary control lines 48 for enabling remote operation of selected bicycle components. The illustrated control lines 48 are routed from the handlebars 40 (i.e., outside the frame 32) to an interior of the frame 32 through the headset bearing assembly 56. A headset cover 90 is positioned axially over the compression ring 72 and is provided with one or more cover openings 92 to receive the one or more control lines 48. Once inside the frame 32, the control lines 48 may be routed through hollow passages within the frame 32 (e.g., within top tube 32T and/or down tube 32D) to a location proximate the controlled component. The frame 32 can thus include one or more control line exit apertures (not shown) whereby one or more of the control lines 48 may be routed back out of the frame 32. A larger central opening 94 in the headset cover 90 receives the steerer tube 52.

Figure 4:
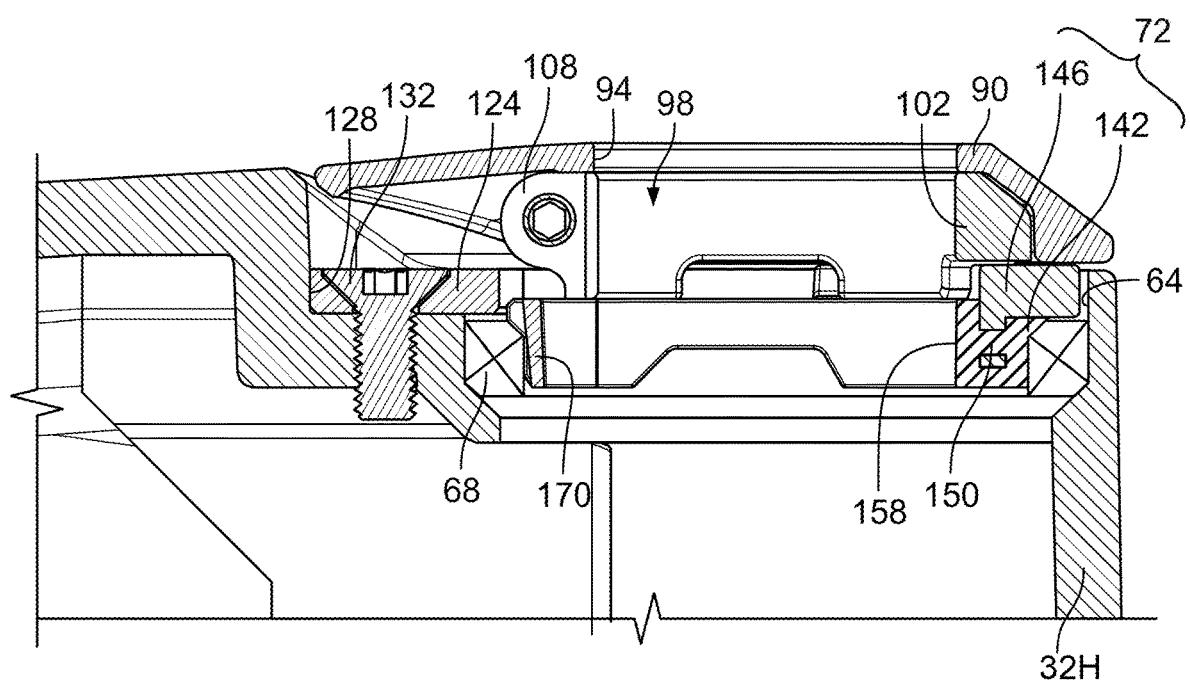
FIG. 4 is a cross-section view taken alone line 4-4 of FIG. 2 with the front fork removed from the head tube.
Figure 5:
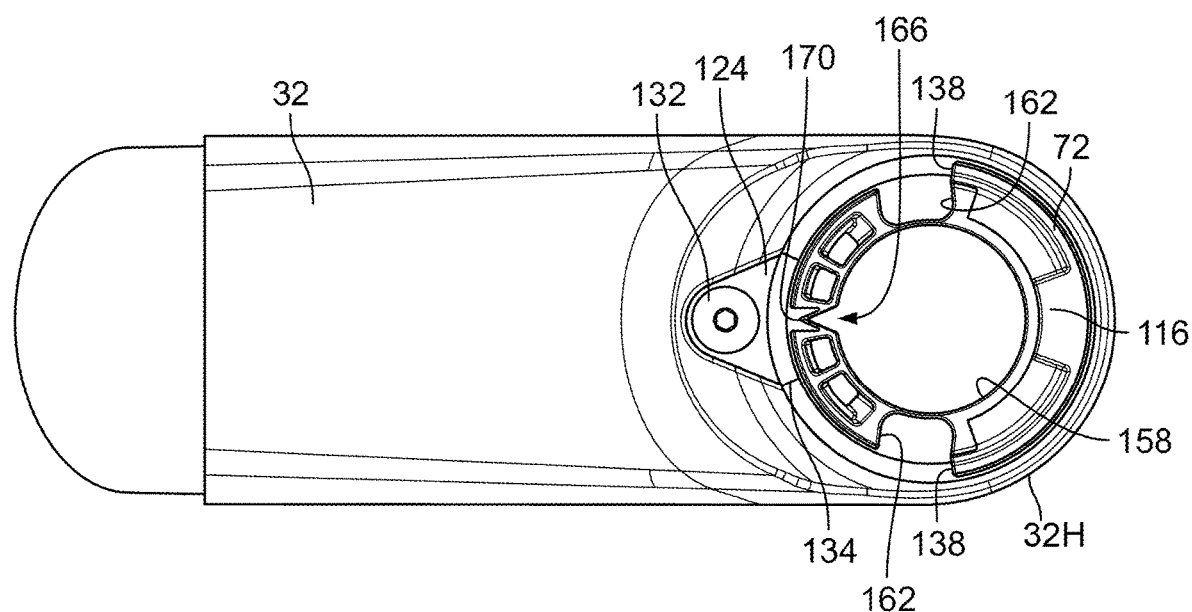
FIG. 5 is a top view of a compression ring of the upper bearing assembly positioned in the head tube of the bicycle frame.
Figure 6:
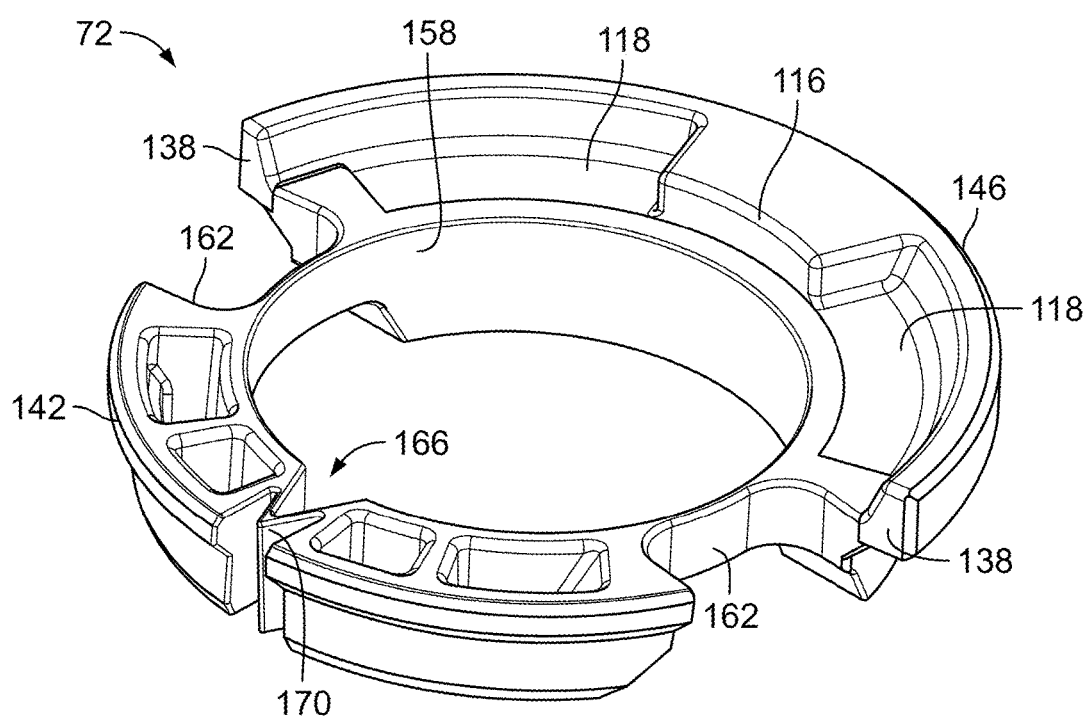
FIG. 6 is a perspective view of the compression ring of FIG. 5.
Figure 7:
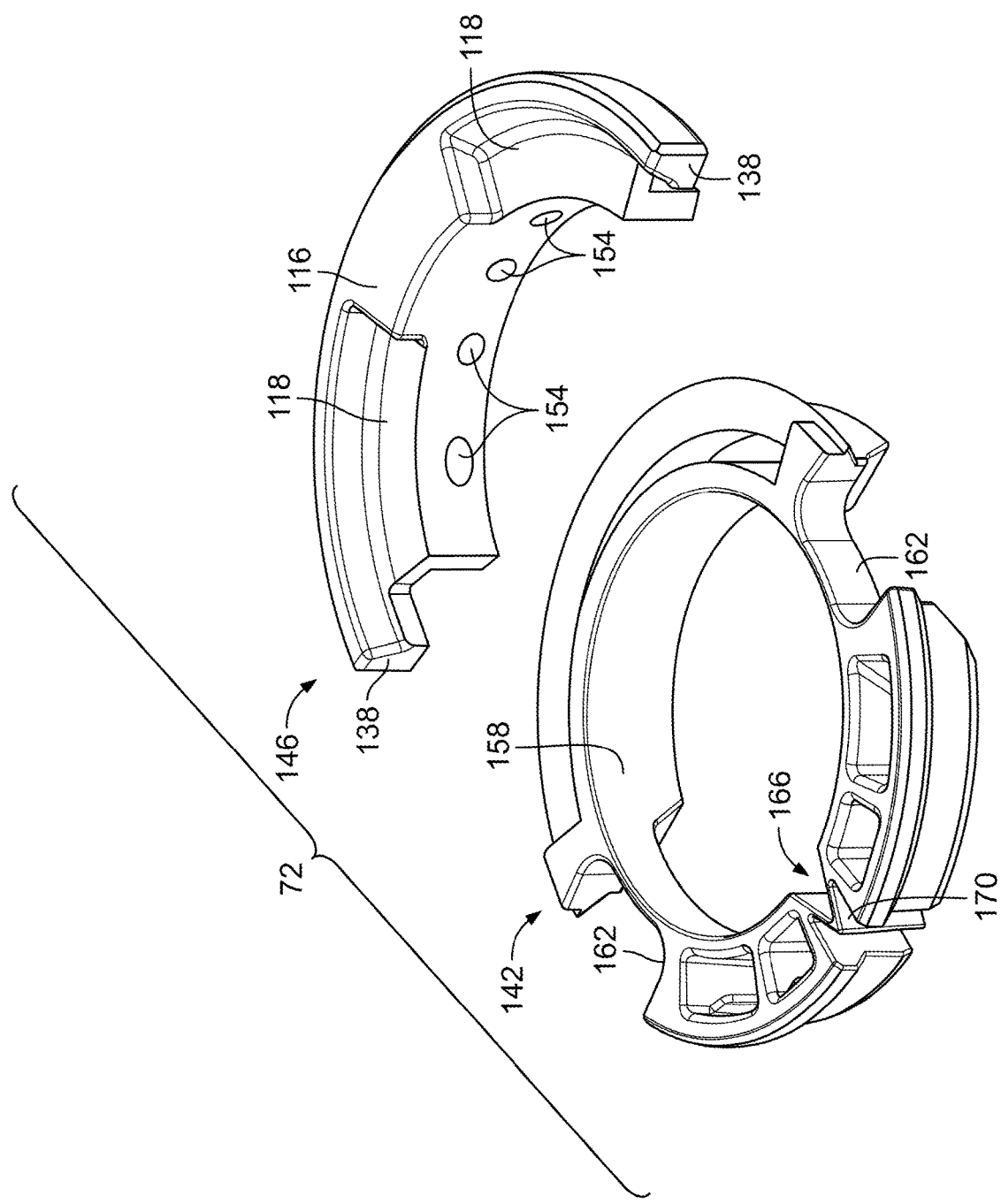
FIG. 7 is an exploded view of the compression ring of FIG. 6.

Referring to FIGS. 3 and 4, in which the steerer tube 52 is removed from view, a steerer tube clamp 98 is provided axially between the headset cover 90 and the compression ring 72. The illustrated steerer tube clamp 98 includes a clamp member 102 secured to the steerer tube 52. For example, the clamp member 102 can be made increasingly tighter on the outer diameter of the steerer tube 52 by tightening a fastener 106, for example a machine screw, that extends transversely through a pair of lobes 108 of the clamp member 102, one of which is threaded. The clamp member 102 is rotationally mated or fixed to the compression ring 72. As illustrated in FIGS. 3, 6, and 7, this is accomplished through complementary shapes formed at the interface between a lower side of the clamp member 102 and an upper side of the compression ring 72. In this example, the clamp member 102 includes a pocket or recess 112 formed between two adjacent lugs 114 that project downward on the lower side of the clamp member 102. Similarly, the upper side of the compression ring 72 is formed with a lug 116 flanked by a pair of pockets or recesses 118. The lug 116 of the compression ring 72 is received into the recess 112 and directly flanked by the lugs 114 of the clamp member 102 when the compression ring 72 and the clamp member 102 are joined together along the steering axis A in the prescribed rotational orientation. Once joined in this way, the compression ring 72 is made rotatable with the clamp member 102, which itself is clamped to and rotates with the steerer tube 52 and the front fork 36 as an assembly.

The range of available rotation of the front fork 36 relative to the frame 32 is limited in order inhibit contact of the front fork 36, handlebars 40, and/or control mechanisms (e.g., actuators 44) with the frame 32. The range of motion may be at least 90 degrees (i.e., +/−45 degrees from center or straight-ahead), although typically less than 180 degrees (i.e., +/−90 degrees from center or straight-ahead). In order to limit the rotation of the front fork 36 relative to the frame 32, the compression ring 72 is positioned relative to the steering axis A in selective rotational interference with a fixed stop member 124 fixed to the frame 32 to inhibit over-rotation of the front fork 36. This may be referred to as "rotational alignment" between the compression ring 72 and the fixed stop member 124. The fixed stop member 124 is adapted to be fixed in relation to the frame 32, e.g., by placement into a form-fitting cavity 128 and retained by a fastener 132. The fixed stop member 124 is provided with left and right stop surfaces 134 arranged to be contacted by respective left and right contact surfaces 138 of the compression ring 72 when the front fork 36 is rotated to its respective left and right angular limits. For cosmetic and other reasons, the headset cover 90 is positioned axially over (over the stop member along an axis parallel to the steering axis A) and shields the stop member 124 throughout the entire range of motion of the front fork 36 relative to the frame 32.

As can be appreciated from the preceding description, the compression ring 72 interfaces with several components, including the steerer tube 52, the bearing member 68, and the fixed stop member 124. The portion(s) of the illustrated compression ring 72 in rotational alignment with the fixed stop member 124, including at least the contact surfaces 138, are constructed of a material having a relatively higher hardness value than other portion(s) of the compression ring 72. In the illustrated construction, the compression ring 72 is formed as a multi-material component including a body portion 142 and a stop portion 146 (FIGS. 4-7). Only the stop portion 146, and not the body portion 142, is rotationally aligned with the fixed stop member 124. The body portion 142 is situated between the bearing member 68 and the front fork 36, particularly the steerer tube 52, to maintain a spacing therebetween. The body portion 142 comprises a first material, and the stop portion 146 comprises a second material that is harder than the first material of the body portion 142. The first material of the body portion 142 can be non-metallic and/or can comprise a polymer material (e.g., nylon, glass filled nylon, or polypropylene). The second material of the stop portion 146 can comprise a metal (e.g., aluminum, titanium, steel, etc.) and/or ceramic material.

Although shown separately in FIG. 7 for the purpose of aiding in the understanding, the body and stop portions 142, 146 of the illustrated embodiment are not readily separable (e.g., by non-destructive means) and need not be assembled or joined during assembly of the bicycle 20. The first material of the body portion 142 can be injection molded to the stop portion 146, which may be pre-formed and placed into a molding die. The process, which may be referred to as insert molding or overmolding, results in characteristic features of the body portion 142 as an overmold. For example, the body portion 142 is locked into and/or onto the stop portion 146. Both the body portion 142 and the stop portion 146 are provided with respective locking portions 150, 154 for this purpose. As shown in FIGS. 4 and 7, one or more locking portions 150 of the body portion 142 extend through one or more locking portions 154 of the stop portion 146. The illustrated locking portions 154 of the stop portion 146 are formed as recesses or apertures 150 (e.g., through a cylindrical wall segment thereof). The illustrated locking portions 150 of the body portion 142 are bridge portions formed as the molten first material (e.g., during injection molding) flows through the locking portions 154 of the stop portion 146. The bridge portions integrally connect with two flanking portions of the body portion 142 on opposing sides of the stop portion 146. In other embodiments, the body and stop portions 142, 146 can be configured for ready assembly and disassembly.

The body portion 142 of the compression ring 72 includes an inner circumferential surface 158 that receives an outer circumferential surface of the steerer tube 52. The body portion 142 alone, and not the stop portion 146, makes contact with the steerer tube 52. The softer first material used in the construction of the body portion 142 is gentler on the surface of the steerer tube 52, which may be composite rather than metal in some constructions and thus more prone to damage by contact with, squeezing upon, or rubbing against metal. The illustrated stop portion 146 is formed as an arcuate segment of less than 180 degrees, following a path offset radially outward of the inner circumferential surface 158.

A radially outer portion of the body portion 142 of the compression ring 72 is formed with one or more apertures 162 to receive control line(s) 48 (FIGS. 1, 2). The illustrated apertures 162 are oriented on lateral sides in alignment with the openings 92 provided in the headset cover 90. The body portion 142 also includes a gap 166 that facilitates compression of the compression ring 72 onto the steerer tube 52. The gap 166 is formed as a change in the cross-sectional profile of the body portion 142. For example, the cross-sectional area of the cross-section profile may be reduced (e.g., by 50 percent or more). In some constructions, the gap 166 can be formed as an open gap, between two free ends of the otherwise ring-shaped body portion 142. In other constructions, a flexible web 170 spans the gap 166. The flexible web 170 is integrally formed (e.g., molded) with the body portion 142. As such, the flexible web 170 can be formed as part of the overmold of the first material of the body portion 142 onto the second material of the stop portion 146. In the illustrated construction, the flexible web 170 is shaped as a "V" as viewed parallel to the steering axis A. However, the flexible web 170 can be formed in other shapes, for example a "U" or a "W"— all of which may be characterized as convoluted shapes. The gap 166, even with the flexible web 170 provides a designated portion of reduced stiffness of the compression ring 72 between two relatively stiffer portions of the compression ring 72.

Figure 10:
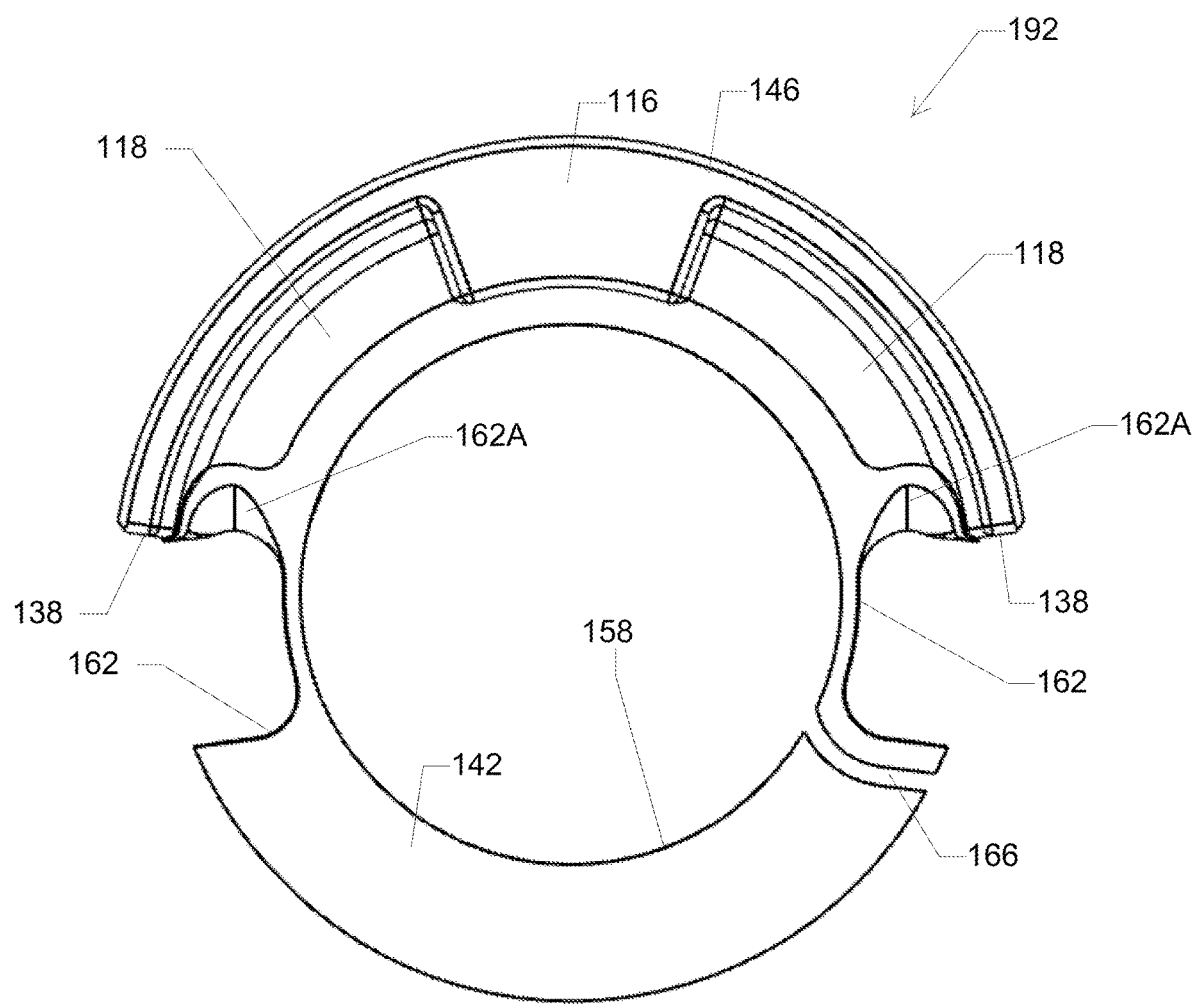
FIG. 10 is a top plan view of the compression ring of FIG. 8.

FIGS. 8-10 illustrate selected components of an alternative embodiment of the present disclosure. It will be appreciated that FIGS. 8-10 illustrate only selected components, but that these components can be used in a headset assembly and a bicycle in a manner similar to that shown and described in the preceding drawings and descriptions. Furthermore, the description below focuses on features unique to the alternative embodiment with the understanding that several features shared with the earlier embodiment are not redundantly described here, and certain reference numbers are re-used where appropriate. As shown in FIGS. 8 and 9, the headset cover 182 and steerer tube clamp 184 are integrally formed as a single clamp-cover member 186. The clamp-cover member 186 can be molded from a polymer (e.g., nylon, glass filled nylon, or polypropylene), and a nut 188 and a bolt 190 are utilized to clamp the clamp-cover member 186 to the fork steerer tube (not shown in FIG. 8).

As with other embodiments described above, rotational coupling between the clamp-cover member 186 and the illustrated compression ring 192 is accomplished through complementary shapes formed at the interface between a lower side of the clamp-cover member 186 and an upper side of the compression ring 192. In this example, the clamp-cover member 192 includes the pocket or recess 112 formed between two adjacent lugs 114 that project downward on the lower side of the clamp-cover member 186. Similarly, the upper side of the compression ring 192 is formed with the lug 116 flanked by the pair of pockets or recesses 118. The lug 116 of the compression ring 192 is received into the recess 112 and directly flanked by the lugs 114 of the clamp-cover member 102 when the compression ring 192 and the clamp-cover member 102 are assembled in the prescribed rotational orientation. Once joined in this way, the compression ring 192 is made rotatable with the clamp-cover member 186, which itself is clamped to and rotates with the steerer tube 52 and the front fork 36 as an assembly.

As with other embodiments described above, the compression ring 192 of FIGS. 8 and 10 includes a stop portion 146 having the contact surfaces 138 and an overmold body portion 142 providing the inner circumferential surface 158 that receives the steerer tube 52. The body and stop portions 142, 146 can have locking portions and separate material construction as described with respect to the embodiment of FIGS. 1-7. The compression ring 192 includes one or more control line apertures 162. However, the control line apertures 162 of the compression ring 192 have sloped forward ends 162A (FIG. 10) that are concave toward the upper side so that the control lines 48 can be at least partially cradled by the forward ends 162A with the control lines 48 at an angle relative to the steer axis A.

The control line apertures 162 are provided in the body portion 142. The body portion 142 of the compression ring 192 also includes a gap 166 that facilitates compression onto the steerer tube 52. The gap 166 is formed as a change in the cross-sectional profile of the body portion 142. In this case, the cross-sectional area of the cross-section profile is reduced completely so that the gap 166 is formed as an open gap between two free ends of the otherwise ring-shaped body portion 142. In other words, contrary to other embodiments described above, there is no flexible web spanning the gap 166 as can be seen from FIG. 10. In addition, rather than being positioned at the rear end of the compression ring 192 and diametrically opposed to the lug 116, the gap 166 is positioned in a lateral portion of the compression ring 192 adjacent one of the control line apertures 162, e.g., directly rearward of the aperture on the right side. Rather than following a straight radial path, the gap 166 has a curved profile as viewed along the steering axis A. In the illustrated embodiment, the curved profile of the gap 166 follows the contour established by a portion of the control aperture 162, as shown in FIG. 10.

Various features of the disclosure are set forth in the following claims.

What is claimed is:

1. A bicycle comprising:
a front wheel and a rear wheel;
a frame supported by the front wheel and the rear wheel;
a front fork;
a fixed stop member fixed in relation to the frame;
a bearing member that supports the front fork relative to the frame for rotation about a steering axis; and
a compression ring that rotates with the front fork and provides axial preload on the bearing member in a direction substantially parallel to the steering axis, the compression ring including:
a body portion between the bearing member and the front fork to maintain a spacing between the bearing member and the front fork, the body portion comprising a first material, and
a stop portion rotationally aligned with the fixed stop member to inhibit over- rotation of the front fork relative to the frame, wherein the stop portion comprises a second material that is harder than the first material of the body portion;
wherein the body portion is not rotationally aligned with the fixed stop member.

2. A bicycle as claimed in claim 1, wherein the first material comprises a polymer.

3. A bicycle as claimed in claim 1, wherein the second material comprises a metal.

4. A bicycle as claimed in claim 1, wherein the stop portion includes a contact surface that contacts the fixed stop member when the front fork is sufficiently rotated, and wherein the contact surface comprises the second material.

5. A bicycle as claimed in claim 1, wherein the second material comprises one or more of aluminum, titanium, ceramic, and steel.

6. A bicycle as claimed in claim 1, wherein the front fork comprises a steerer tube, and wherein the bicycle further comprises a clamp member secured to the steerer tube and rotationally fixed to the compression ring.

7. A bicycle as claimed in claim 6, wherein the body portion includes a gap that facilitates compression of the compression ring onto the steerer tube, and wherein the compression ring further includes a flexible web spanning the gap.

8. A bicycle as claimed in claim 1, wherein the compression ring comprises an aperture and wherein the bicycle further includes a control line positioned through the aperture.

9. A bicycle as claimed in claim 8, further comprising a headset cover positioned axially over the compression ring and including an opening, the control line being positioned through the opening.

10. A bicycle as claimed in claim 9, wherein the headset cover is positioned axially over the fixed stop member throughout an entire range of motion of the front fork relative to the frame.

11. A bicycle as claimed in claim 1, wherein the body portion is formed as an overmold on the stop portion.

12. A bicycle headset bearing assembly adapted to be mounted between a bicycle frame and a front fork, the bearing assembly comprising:
a fixed stop member adapted to be fixed in relation to the frame;
a bearing member adapted to support the front fork relative to the frame for rotation about a steering axis; and
a compression ring adapted to rotate with the front fork and provide axial preload on the bearing member in a direction substantially parallel to the steering axis, the compression ring including:
a body portion adapted to maintain a spacing between the bearing member and the front fork, the body portion comprising a first material, and
a stop portion rotationally aligned with the fixed stop member to inhibit over-rotation of the front fork relative to the frame, wherein the stop portion comprises a second material that is harder than the first material of the body portion;
wherein the body portion is not rotationally aligned with the fixed stop member.

13. A bicycle headset bearing assembly as claimed in claim 12, wherein the first material comprises a polymer.

14. A bicycle headset bearing assembly as claimed in claim 12, wherein the second material comprises a metal.

15. A bicycle headset bearing assembly as claimed in claim 12, wherein the stop portion includes a contact surface adapted to contact the fixed stop member when sufficiently rotated, and wherein the contact surface comprises the second material.

16. A bicycle headset bearing assembly as claimed in claim 12, wherein the second material comprises one or more of aluminum, titanium, ceramic, and steel.

17. A bicycle headset bearing assembly as claimed in claim 12, wherein the body portion includes a gap that facilitates compression of the compression ring, and wherein the compression ring further includes a flexible web spanning the gap.

18. A bicycle headset bearing as claimed in claim 12, wherein the body portion is formed as an overmold on the stop portion.

19. A bicycle headset bearing assembly adapted to be mounted between a bicycle frame and a front fork, the bearing assembly comprising:
a fixed stop member adapted to be fixed in relation to the frame;
a bearing member adapted to support the front fork relative to the frame for rotation about a steering axis; and
a compression ring adapted to rotate with the front fork and provide axial preload on the bearing member in a direction substantially parallel to the steering axis, the compression ring including:
a body portion adapted to maintain a spacing between the bearing member and the front fork, the body portion comprising a first material, and
a stop portion rotationally aligned with the fixed stop member to inhibit over-rotation of the front fork relative to the frame, wherein the stop portion comprises a second material that is harder than the first material of the body portion;
wherein the body portion includes a gap that facilitates compression of the compression ring, and wherein the compression ring further includes a flexible web spanning the gap.

* * * * *